United States Patent [19]

Nygaard

[11] 4,270,076
[45] May 26, 1981

[54] CIRCUIT FOR A BRUSHLESS D.C. MOTOR

[75] Inventor: Nils H. Nygaard, Sønderborg, Denmark

[73] Assignee: Danfoss A/S, Nordborg, Denmark

[21] Appl. No.: 70,619

[22] Filed: Aug. 29, 1979

[30] Foreign Application Priority Data

Sep. 13, 1978 [DE] Fed. Rep. of Germany ....... 2839712

[51] Int. Cl.³ .............................................. H02P 6/02
[52] U.S. Cl. .................................... 318/254; 318/138; 318/439
[58] Field of Search ................... 318/138, 254, 254 A, 318/696, 439

[56] References Cited

U.S. PATENT DOCUMENTS

| 3,364,408 | 1/1968 | Katz et al. | 318/138 |
| 3,365,636 | 1/1968 | Baker | 318/138 |
| 3,838,322 | 9/1974 | Greenwell | 318/138 |
| 4,072,888 | 2/1978 | Bechtle et al. | 318/696 |

FOREIGN PATENT DOCUMENTS 2237842  2/1974  Fed. Rep. of Germany .......... 318/138

Primary Examiner—S. J. Witkowski
Assistant Examiner—John W. Redman
Attorney, Agent, or Firm—Wayne B. Easton

[57] ABSTRACT

The invention relates to a brushless type DC motor assembly of the type having a permanent magnet rotor and a pair of poles provided with two windings, the windings having a common junction which is connectable to the positive terminal of a DC voltage source. A pair of controlled rectifiers in respective series with the windings are followed by a series branch having a smoothing choke and an electronic chopper switch, the series branch being connectable to the negative terminal of the DC voltage source. The invention is directed to an improved circuit permitting operation of the motor at higher power by providing an extinguishing circuit for the controlled rectifiers which includes a series arranged extinguishing capacitor and a swingover choke that connects the upstream sides of the controlled rectifiers. The extinguishing circuit also includes extinguishing diodes connected in antiparallel respectively to the rectifiers. At least one free running diode is provided which bridges at least the smoothing choke and the chopper switch.

1 Claim, 5 Drawing Figures

CIRCUIT FOR A BRUSHLESS D.C. MOTOR

The invention relates to a circuit for a brushless D.C. motor comprising a permanent magnet rotor and at least one pair of poles that is provided with two windings connected by way of a common central connection to one pole of a D.C. voltage source and by way of a respective semi-conductor switching element and a common series circuit of a smoothing choke and an electronic chopper switch to the other pole of the D.C. voltage source, a return diode being interposed between the junction of the smoothing choke and chopper switch and the central connection, and a detector device which detects the angular position of the rotor switching the semi-conductor switching elements on and off in push-pull by means of a control circuit.

In a known circuit of this kind, a D.C. motor is provided with two pairs of poles and consequently four windings which are all connected to the central connection. The semi-conductor switching elements are transistors controlled by the control device in relation to the rotary position of the rotor; the power of the motor is limited by the switching power of the transistors, primarily because they are loaded by the high transformer-produced voltages when the windings are switched off. Power-reducing losses also occur during remagnetisation of the magnetic circuit. To control the rotary speed, the voltage applied to the motor windings is adjustable. This occurs with the aid of the chopper switch which is likewise in the form of a transistor. It is fed with control pulses by speed regulator, the control pulses having a higher frequency than the switching-over frequency of the first-mentioned transistors. From the current pulses passed by the chopper switch, the smoothing choke forms a mean current value in conjunction with the return diode.

Further, a three-phase inverter is known which is energised by a D.C. voltage source which delivers a constant voltage and comprises a bridge rectifier energised by A.C. voltage and is followed by a smoothing condenser. In each phase the load is connected by way of a transformer of which the primary winding comprises two parts of which the central connection is connected to one pole of the D.C. voltage source. The other ends of the winding parts are each connected by way of the series circuit of a blocking diode and a controlled rectifier to the other pole of the D.C. voltage source. A free-running diode bridges this series circuit. An extinguishing series circuit consisting of an extinguishing condenser and a swing-over choke is connected between the junctions of the blocking diode and controlled rectifier of both series circuits. Under the influence of the constant D.C. voltage and the counter-emf. produced in the respective switched-off winding part, this extinguishing rectifier receives a constant charge with alternating polarity that is sufficient to extinguish the respective ignited controlled rectifier. The free-running diodes permit the energy stored in the magnetic circuit to be converted to electric power during each remagnetisation step and to be returned to the D.C. voltage source.

The invention is based on the problem of providing a circuit of the aforementioned kind which permits a brushless D.C. motor to be operated at higher power.

This problem is solved according to the invention in that the semi-conductor switching elements are controlled rectifiers, that an extinguishing circuit is provided comprising an extinguishing series circuit of an extinguishing condenser and a swing-over choke that connects the sides of the controlled rectifiers remote from the smoothing choke and comprising a respective extinguishing diode connected in anti-parallel to each controlled rectifier, and that at least one free-running diode is provided which bridges at least the smoothing choke and the chopper switch.

In this circuit, the motor can be operated at higher power because the controlled rectifiers have a higher switching power than transistors and are in particular loadable by higher voltages. However, this requires an extinguishing circuit which always makes an adequate commutation energy available, even if the voltage energising the motor windings is low at a low speed. In the present case it is not necessary to make the extinguishing condenser larger and consequently a comparatively short charging time will be adequate because, despite the variable mean value of the motor voltage because of the function of the chopper switch the full D.C. voltage will always be applied to the motor windings in short time intervals so that the extinguishing condenser can be rapidly charged to about twice the voltage of the D.C. voltage source in conjunction with the counter-emf. of the respective switched-off motor winding. A further saving of power is obtained by the use of the free-running diode which, because of its special position, permits a recovery of energy during the remagnetisation step by transmission to the respective other motor winding despite the presence of the chopper switch and the smoothing choke.

In some cases it is sufficient if only one free-running diode is provided which bridges the smoothing choke and chopper switch, because the free-running circuit can close by way of the extinguishing diodes. However, it is more favourable if a respective free-running diode is connected between the side of each winding remote from the central connection and the other pole of the D.C. voltage source. In this case comparatively small extinguishing diodes and free-running diodes can be used because each of these diodes need merely conduct the current associated with it.

Further, a blocking diode poled in the same sense as the controlled rectifier may be connected between each winding and the extinguishing series circuit. A partial discharge of the extinguishing condenser by way of the windings is prevented with the aid of these blocking diodes. The blocking diodes also permit a D.C. voltage source to be used which has on A.C. voltage component.

The extinguishing diodes can bridge the respective series circuit of blocking diode and controlled rectifier, particularly if only one free-running diode is provided which bridges the chopper switch and the smoothing choke. When using two free-running diodes, however, it is more favourable if each extinguishing diode bridges only the controlled rectifier. This reduces the extinguishing power because the voltage drop of only one diode need be considered in the extinguishing circuit.

In addition, the controlled rectifier and extinguishing diode may form an integrated structural unit. Such components are commercially available. They have the advantage that the controlled rectifier can in the first place be loaded in the blocking direction only by the voltage drop of the extinguishing diode and consequently the corresponding voltage stability may be very low (asymmetric thyristor).

Advantageously, means are provided which stop the rotor at a point beyond the position at which the control device switches over the controlled rectifiers. Such means can for example consist of a permanent magnet. In this way one ensures that a certain amount of time elapses up to the first switch-over, sufficient to charge the extinguishing condenser for the first extinguishing step.

The invention will now be described in more detail with reference to preferred examples illustrated in the drawing, wherein.

Figure 1:
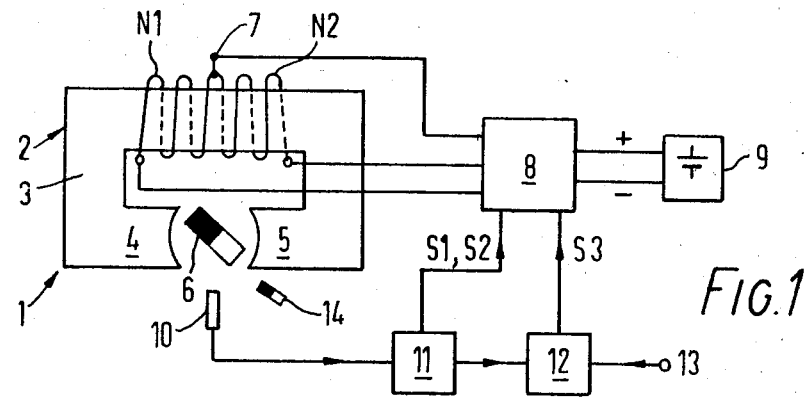
FIG. 1 is a block diagram of the circuit according to the invention.

FIG. 1 shows a brushless D.C. motor 1 having a two-pole stator 2 with a magnetic circuit 3 having two poles 4 and 5. The rotor 6 comprises a permanent magnet. Each pole 4 and 5 is associated with a respective winding N1 and N2. The windings have a common central connection 7 and, viewed spatially, are wound in the same sense. They are fed with current alternately by way of a switching device 8. This switching device is connected to a D.C. voltage source 9 of constant D.C. voltage. This can for example be formed by a battery or by a rectifier circuit which is energized by an A.C. voltage and possibly provided with a smoothing element. A detector device 10, for example a Hall generator, delivers a signal depending on the angular position of the rotor 6 to a control device 11 which delivers the corresponding switch-over signal s1, s2 to the switching device 8. A speed regulator 12 receives a signal corresponding to the existing value of the speed by way of the control device 11 and a signal corresponding to the desired value of the speed by way of an input 13. This speed regulator delivers a control signal s3 to the switching device 8. Further, means 14 are provided, in this case a permanent magnet, which bring the rotor to a standstill at a point beyond that position in which the control device 11 undertakes switching over.

Figure 2:
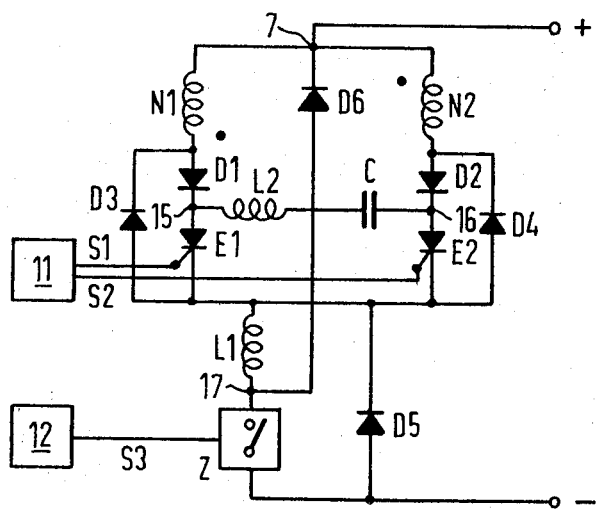
FIG. 2 is the circuit of a first embodiment.
Figure 3:
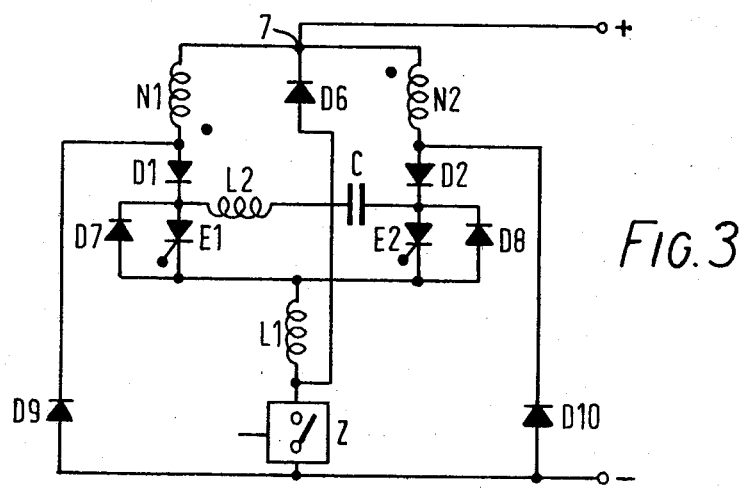
FIG. 3 is the circuit of a second embodiment.

FIGS. 2 and 3 show examples of the switching device 8 in conjunction with the windings N1 and N2.

In FIG. 2, the winding N1 is in series with a blocking diode D1 and a controlled rectifier E1. The winding N2 is in series with a blocking diode D2 and a controlled rectifier E2. Both series circuits are in turn connected in series to a smoothing choke L1 and an electronic chopper switch Z which is built up in conventional manner, for example with the aid of a further controlled rectifier, but can also be formed by a transistor or the like. The controlled rectifiers E1 and E2 are energised by the control signals s1 and s2 of the control device 11 and the chopper switch Z is energised by the control signal s3 of the speed regulator 12. The series circuit of the blocking diode D1 and the controlled rectifier E1 is bridged by an extinguishing diode D3 connected in anti-parallel and the series circuit of the blocking diode D2 and the controlled rectifier E2 is bridged by an extinguishing diode D4 connected in anti-parallel. The extinguishing circuit also comprises a series circuit of an extinguishing condenser C and a swing-over choke 12. This series is disposed between the junction 15 of the blocking diode D1 and the controlled rectifier E1 and the junction 16 of the blocking diode D2 and the controlled rectifier E2. There is also a free-running diode D5 which bridges the smoothing choke L1 and the chopper switch Z. A return diode D6 connects the central connection 7 to the junction 17 between the smoothing choke L1 and the chopper switch Z.

Figure 4:
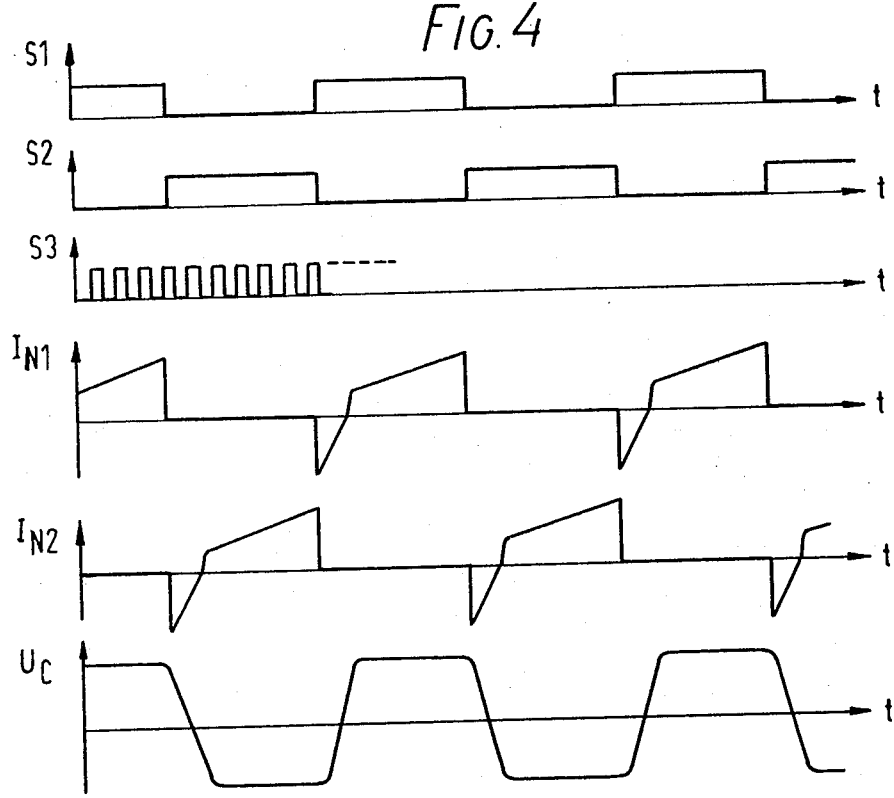
FIG. 4 shows a few current and voltage curves against time during operation.
Figure 5:
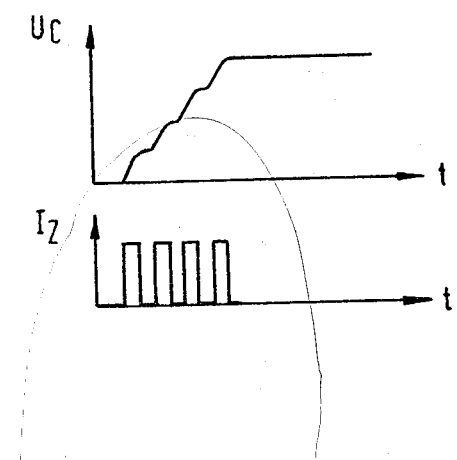
FIG. 5 shows a few current and voltage curves against time during starting.

The function of this circuit will now be described in more detail with reference to the current and voltage curves shown in FIG. 4. With the aid of the control signals s1 and s2, the controlled rectifiers E1 and E2 are alternately brought to the conductive state. With the aid of the control signal s3, the chopper switch Z is continuously switched on and off. The switching frequency is considerably higher, in general ten times or more than the switching-over frequency of the controlled rectifiers. Despite this chopper function, a continuous current flows through the motor windings during the switching-on period because the smoothing choke L1 forces a return current to flow through the return diode D6 during the blocking periods of the chopper switch Z. By altering the pulse width of the control signal s3 and/or by altering its frequency, the on-off period relationship of the chopper Z can be changed. The result of this is that the voltage applied to the motor windings N1 and N2 is regulated, which in turn results in an alteration of the motor current and thus of the motor speed.

Since controlled rectifiers can be employed as semiconductor switching elements to produce a higher motor power, an extinguishing circuit is required in contrast with transistors. The extinguishing circuit comprises an extinguishing series circuit consisting of the extinguishing condenser C and the swing-over choke L2 between the junctions 15 and 16 as well as the two extinguishing diodes D3 and D4. It will be assumed that the controlled rectifier E1 is ignited and the extinguishing condenser C is so charged that it has a positive potential on the right-hand plate. If, now, the controlled rectifier E2 is ignited, an extinguishing current flows through this controlled rectifier E2, the controlled rectifier E1 and the swing-over choke L2 back to the extinguishing condenser C. This current eliminates the current in the controlled rectifier E1, so that the latter blocks. The current then still flowing is used by way of the extinguishing diode D3, the blocking diode D1 and the swing-over choke L2 for oppositely charging the extinguishing condenser C. Subsequently, the extinguishing condenser C is charged further up to about twice the value of the D.C. voltage because after extinguishing of the controlled rectifier E1 a remagnetisation of the magnetic circuit 3 takes place during which a voltage is produced in the winding N1 that is superimposed on the voltage of the D.C. voltage source 9. This high voltage is always effective when the chopper switch Z is in the conductive state. This means that the extinguishing condenser C receives the missing amount of charge in surges, namely, in the sequence of switching on the chopper switch Z. This nature of charging is independent of the motor voltage set with the aid of the speed regulator 12. If, now, the controlled rectifier E1 is ignited, the extinguishing condenser C is discharged in the opposite direction, whereby the controlled rectifier E2 is extinguished. The extinguishing condenser voltage $U_C$ therefore has the shape shown in FIG. 4.

During extinguishing of the controlled rectifier E1, the current in the winding N1 is suddenly interrupted if one disregards the current pulses for supplementing the charge of the extinguishing condenser C. This induces a negative current in the winding N2 in the manner of a transformer, which flows back to the D.C. voltage source 9 because the circuit through the free-running diode D5 and the extinguishing diode D4 is closed. This current is linked with a magnetic flux in the same direction as that which was produced by the positive current in the winding N1. This negative current through the winding N2 can be used to perform work if the electric switching-over takes place before the instant at which the magnetic axis of the rotor passes through the magnetic neutral plane of the stator. Subsequently, an increasing positive current is produced to flow through the winding N2 until the controlled rectifier E2 is extinguished. A negative current is now induced in the winding N1. The curve for the two winding currents $I_{N1}$ and $I_{N2}$ is shown in FIG. 4.

Since the standstill means 14 cause the rotor 6 to come to a standstill at a point beyond that position where switching-over takes place, a certain time elapses until the first switching over. During this time, the extinguishing condenser C is charged to the full condenser voltage in steps, namely, whenever the chopper switch Z is conductive and a current $I_Z$ flows through it.

In the FIG. 3 embodiment, two extinguishing diodes D7 and D8 are provided which each bridge only the controlled rectifier E1 or E2, respectively. This has the advantage that only one diode is located in the extinguishing circuit after the controlled rectifier has been extinguished. The voltage drop is correspondingly low and charging of the extinguishing condenser C caused by the swing-over choke L2 is correspondingly small so that the supplementary charging is correspondingly small. In addition, the pairs E1 - D7 and E2 - D8 are respectively accommodated in an integrated structural part so that asymmetric thyristors can be used which erely require a low blocking voltage in the blocking direction.

Further, two free-running diodes D9 and D10 are provided instead of one free-running diode D5. They respectively join the side of a coil N1 or N2 remote from the central connection 7 to the pole of the D.C. voltage source 9 facing the chopper switch Z. Whereas the extinguishing diodes D7 and D8 need only conduct the extinguishing current, the free-running diodes D9 and D10 need only conduct the free-running current. The diodes can therefore be comparatively weak.

In both examples, the blocking diodes D1 and D2 can also be omitted at the sacrifice of the extinguishing condenser C always partially discharging again by way of the two windings.

What is claimed is:

1. A DC motor assembly comprising, a permanent magnet rotor, a pair of poles, parallel circuit branches having a pair of windings with a common positive terminal connection for a DC voltage source, a pair of controlled rectifiers in said branches in respective series with said windings, a series branch connected to said parallel branches and having a smoothing choke and an electronic chopper switch connected in series, said series branch having a negative terminal connection for a DC voltage source, a return diode interposed between the junction of said smoothing choke and said chopper and said positive terminal connection, detector means for detecting the angular position of said rotor, means for switching said controlled rectifiers on and off in a push-pull mode, an extinguishing circuit which includes a series circuit of an extinguishing capacitor and a swing-over choke connected between the stream sides of said controlled rectifiers, said extinguishing circuit including extinguishing diodes connected in respective antiparallel relation to said controlled rectifiers, at least one free running diode bridging at least said smoothing choke and said chopper switch blocking diodes poled in the same sense as the said controlled rectifiers connected respectively between said controlled rectifiers and said windings and upstream from said series circuit containing said extinguishing capacitor and said swing-over choke.

* * * * *